United States Patent [19]
Yamada et al.

[11] Patent Number: 5,996,070
[45] Date of Patent: Nov. 30, 1999

[54] MICROPROCESSOR CAPABLE OF EXECUTING CONDITION EXECUTION INSTRUCTIONS USING ENCODED CONDITION EXECUTION FIELD IN THE INSTRUCTIONS

[75] Inventors: Akira Yamada; Toyohiko Yoshida; Toru Kengaku, all of Tokyo, Japan

[73] Assignee: Mitsubishi Denki Kabushiki Kaisha, Tokyo, Japan

[21] Appl. No.: 08/783,445

[22] Filed: Jan. 16, 1997

[30]     Foreign Application Priority Data

Jul. 30, 1996  [JP]  Japan ................................ 8-200847

[51] Int. Cl.$^6$ ........................................ G06F 9/30
[52] U.S. Cl. ........................ 712/236; 712/218; 708/520
[58] Field of Search ................... 395/376, 394, 395/581, 503; 364/736.5; 712/218, 236; 708/520

[56]          References Cited

U.S. PATENT DOCUMENTS

| | | | |
|---|---|---|---|
| 4,513,393 | 4/1985 | Edlund et al. ............................... | 710/5 |
| 4,594,651 | 6/1986 | Jaswa et al. .............................. | 364/131 |
| 5,371,862 | 12/1994 | Suzuki et al. ............................ | 712/234 |
| 5,471,593 | 11/1995 | Branigin ................................. | 712/235 |
| 5,517,628 | 5/1996 | Morrison et al. ........................ | 712/234 |
| 5,583,804 | 12/1996 | Seal et al. ................................ | 708/523 |
| 5,771,377 | 6/1998 | Ando ..................................... | 712/239 |

FOREIGN PATENT DOCUMENTS

| | | |
|---|---|---|
| 56-80747 | 7/1981 | Japan . |
| 59-95646 | 6/1984 | Japan . |
| 59-99550 | 6/1984 | Japan . |
| 62-143140 | 6/1987 | Japan . |
| 2-228733 | 9/1990 | Japan . |
| 3-67332 | 3/1991 | Japan . |
| 6-311012 | 11/1994 | Japan . |
| 7-86916 | 3/1995 | Japan . |
| 7-182165 | 7/1995 | Japan . |
| 1480209 | 7/1977 | United Kingdom . |
| 2282245 | 3/1995 | United Kingdom . |

OTHER PUBLICATIONS

Acorn Risc Machine Family Data—The 32–Bit RISC Microprocessor System, VLSI Technology, Inc., 1990, pp. 2–29.

*Primary Examiner*—Kenneth S. Kim
*Attorney, Agent, or Firm*—Burns, Doane, Swecker & Mathis, LLP

[57]          ABSTRACT

A 3-bit condition execution field in an condition execution instruction stores an encoded value obtained by encoding a condition stored in an general purpose flag indicating to execute the condition execution instruction. A microprocessor has an instruction decode unit 2 comprising a condition execution decode section 401 for decoding a value in the condition execution field and a condition execution judgement section 402 for judging whether or not the decoded result from the condition execution decode section 401 is equal to a condition stored in general purpose flags, and outputting the indication to execute the condition execution instruction when both are equal.

11 Claims, 16 Drawing Sheets

| CC | F0 | F1 | F2 | CC | F0 | F1 | F2 | CC | F0 | F1 | F2 |
|---|---|---|---|---|---|---|---|---|---|---|---|
| 00000 | TRUE | TRUE | TRUE | 01001 | FALSE | TRUE | TRUE | 10010 | NEGLECTED | TRUE | TRUE |
| 00001 | TRUE | TRUE | FALSE | 01010 | FALSE | TRUE | FALSE | 10011 | NEGLECTED | TRUE | FALSE |
| 00010 | TRUE | TRUE | NEGLECTED | 01011 | FALSE | TRUE | NEGLECTED | 10100 | NEGLECTED | TRUE | NEGLECTED |
| 00011 | TRUE | FALSE | TRUE | 01100 | FALSE | FALSE | TRUE | 10101 | NEGLECTED | FALSE | TRUE |
| 00100 | TRUE | FALSE | FALSE | 01101 | FALSE | FALSE | FALSE | 10110 | NEGLECTED | FALSE | FALSE |
| 00101 | TRUE | FALSE | NEGLECTED | 01110 | FALSE | FALSE | NEGLECTED | 10111 | NEGLECTED | FALSE | NEGLECTED |
| 00110 | TRUE | NEGLECTED | TRUE | 01111 | FALSE | NEGLECTED | TRUE | 11000 | NEGLECTED | NEGLECTED | TRUE |
| 00111 | TRUE | NEGLECTED | FALSE | 10000 | FALSE | NEGLECTED | FALSE | 11001 | NEGLECTED | NEGLECTED | FALSE |
| 01000 | TRUE | NEGLECTED | NEGLECTED | 10001 | FALSE | NEGLECTED | NEGLECTED | 11010 | NEGLECTED | NEGLECTED | NEGLECTED |

FIG. 3
(PRIOR ART)

| EFFECTIVENESS Cv | VALUE Cd | MEANINGS |
|---|---|---|
| 1 | 1 | TRUE |
| 1 | 0 | FALSE |
| 0 | X | NEGLECTED |

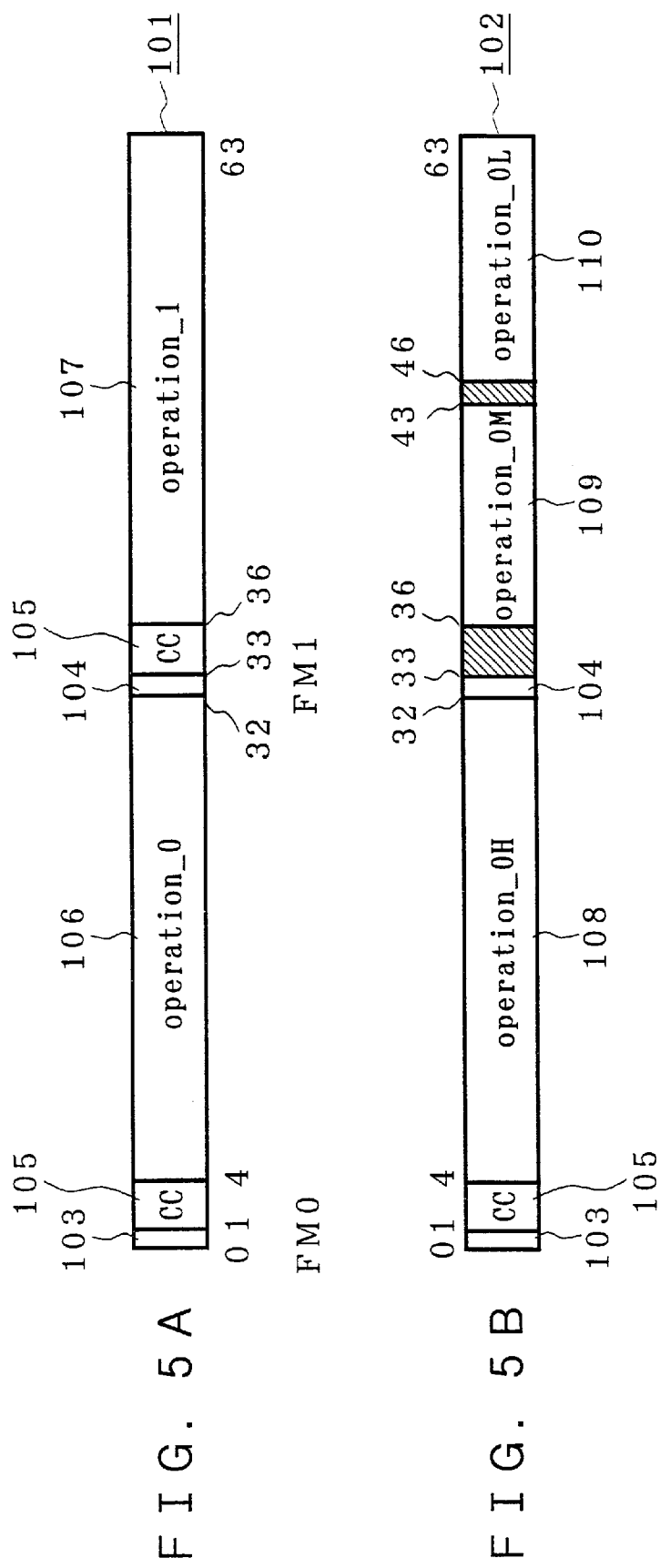

FIG. 6

| Format | Bit positions: 0, 7, 9, 15, 21, 27 | Ref |
|---|---|---|
| Short M | OPCODE \| X \| Ra \| Rb \| SOURCE | 111 |
| | 120  124  121  122  123 | |
| Short A | OPCODE \| X' \| 0 \| Ra \| Rb \| SOURCE | 112 |
| | 120  125  121  122  123 | |
| Short B1 | OPCODE \| 0 \| 0 \| 0 \| 0 \| Rc | 113 |
| | 120              126 | |
| Short B2 | OPCODE \| 1 \| 0 \| DISPLACEMENT:18 | 114 |
| | 120        127 | |
| Short B3 | OPCODE \| Y \| Z \| Ra \| SOURCE | 115 |
| | 120  129  130  121  128 | |
| Short D1 | OPCODE \| Y \| 0 \| Ra \| SOURCE | 116 |
| | 120  129  121  128 | |
| Short D2 | OPCODE \| Y \| 0 \| ct:6 \| SOURCE | 117 |
| | 120  129  131  128 | |
| Long 1 | OPCODE \| 1 \| 0 \| Ra \| Rb \| IMMEDIATE VALUE:32 (to bit 53) | 118 |
| | 120  121  122  132 | |
| Long 2 | OPCODE \| 1 \| Z \| Ra \| Rb \| IMMEDIATE VALUE:32 (to bit 53) | 119 |
| | 120  133  121  122  132 | |

(123)
X=00 => SOURCE=Rc
X=01 => SOURCE=Rc;Rb++
X=11 => SOURCE=Rc;Rb--
X=10 => SOURCE=IMMEDIATE VALUE:6

(123)
X'=0 => SOURCE=Rc
X'=1 => SOURCE=IMMEDIATE VALUE:6

(128)
Y=0 => SOURCE=Rc
Y=1 => SOURCE=IMMEDIATE VALUE:12
Z=0 => TEST FOR ZERO
Z=1 => TEST FOR VALUES OTHER THAN ZERO

FIG. 7A

GENERAL PURPOSE REGISTER ~5

| | 0 | 15 16 | 31 | ~140 |
|---|---|---|---|---|
| R0=0 | R0H=0 | | R0L=0 | |
| R1 | R1H | | R1L | |
| R2 | R2H | | R2L | |
| ... | | | | |
| R62=LINK | R62H | | R62L | |
| R63=SPU | R63H | | R63L | ~141 |
| R63=SPI | R63H | | R63L | ~142 |

FIG. 7B

CONTROL REGISTER ~150

| | 0 | 31 | ~151 |
|---|---|---|---|
| CR0 | PC:PROGRAM COUNTER | | |
| CR1 | PSW:PROCESSOR STATUS WORD | | ~10 |
| CR2 | BPC:BACKUP PROGRAM COUNTER | | |
| CR3 | BPSW:BACK UP PROCESSOR STATUS WORD | | |
| CR4 | reserved | | |
| CR5 | reserved | | |
| CR6 | RPT_C:REPEAT COUNT | | |
| CR7 | RPT_S:REPEAT START ADDRESS | | |
| CR8 | RPT_E:REPEAT END ADDRESS | | |
| CR9 | MOD_S:MODULO START ADDRESS | | |
| CR10 | MOD_E:MODULO END ADDRESS | | |
| CR11 | IBA:INSTRUCTION BREAK ADDRESS | | |

FIG. 7C

ACCUMULATOR ~18

| | 0 | 31 32 | 63 |
|---|---|---|---|
| A0 | A0H | | A0L |
| A1 | A1H | | A1L |

FIG. 8

| 0 | | | | | | | 7 | 8 | | | | | | | 15 |
|---|---|---|---|---|---|---|---|---|---|---|---|---|---|---|---|
| SM | 0 | EA | DB | 0 | IE | RP | MD | 0 | 0 | 0 | 0 | 0 | 0 | 0 | 0 |

170

171: SM
172: EA
173: DB
174: IE
175: RP
176: MD

| 16 | | | | | | | 23 | 24 | | | | | | | 31 |
|---|---|---|---|---|---|---|---|---|---|---|---|---|---|---|---|
| 0 | F0 | 0 | F1 | 0 | F2 | 0 | F3 | 0 | F4 | 0 | F5 | 0 | F6 | 0 | F7 |

EXECUTE AT MEMORY UNIT OR INTEGER OPERATION UNIT
| IF | D/A | E/M | W | ~200

EXECUTE AT MEMORY UNIT OR INTEGER OPERATION UNIT
| IF | D/A | E/M | W |

EXECUTE AT MEMORY UNIT OR INTEGER OPERATION UNIT
| IF | D/A | E/M | W |

FIG. 13

| CC | F0 | F1 | F2 | CC | F0 | F1 | F2 | CC | F0 | F1 | F2 |
|---|---|---|---|---|---|---|---|---|---|---|---|
| 00000 | TRUE | TRUE | TRUE | 01001 | FALSE | TRUE | TRUE | 10010 | NEGLECTED | TRUE | TRUE |
| 00001 | TRUE | TRUE | FALSE | 01010 | FALSE | TRUE | FALSE | 10011 | NEGLECTED | TRUE | FALSE |
| 00010 | TRUE | TRUE | NEGLECTED | 01011 | FALSE | TRUE | NEGLECTED | 10100 | NEGLECTED | TRUE | NEGLECTED |
| 00011 | TRUE | FALSE | TRUE | 01100 | FALSE | FALSE | TRUE | 10101 | NEGLECTED | FALSE | TRUE |
| 00100 | TRUE | FALSE | FALSE | 01101 | FALSE | FALSE | FALSE | 10110 | NEGLECTED | FALSE | FALSE |
| 00101 | TRUE | FALSE | NEGLECTED | 01110 | FALSE | FALSE | NEGLECTED | 10111 | NEGLECTED | FALSE | NEGLECTED |
| 00110 | TRUE | NEGLECTED | TRUE | 01111 | FALSE | NEGLECTED | TRUE | 11000 | NEGLECTED | NEGLECTED | TRUE |
| 00111 | TRUE | NEGLECTED | FALSE | 10000 | FALSE | NEGLECTED | FALSE | 11001 | NEGLECTED | NEGLECTED | FALSE |
| 01000 | TRUE | NEGLECTED | NEGLECTED | 10001 | FALSE | NEGLECTED | NEGLECTED | 11010 | NEGLECTED | NEGLECTED | NEGLECTED |

F I G. 1 8
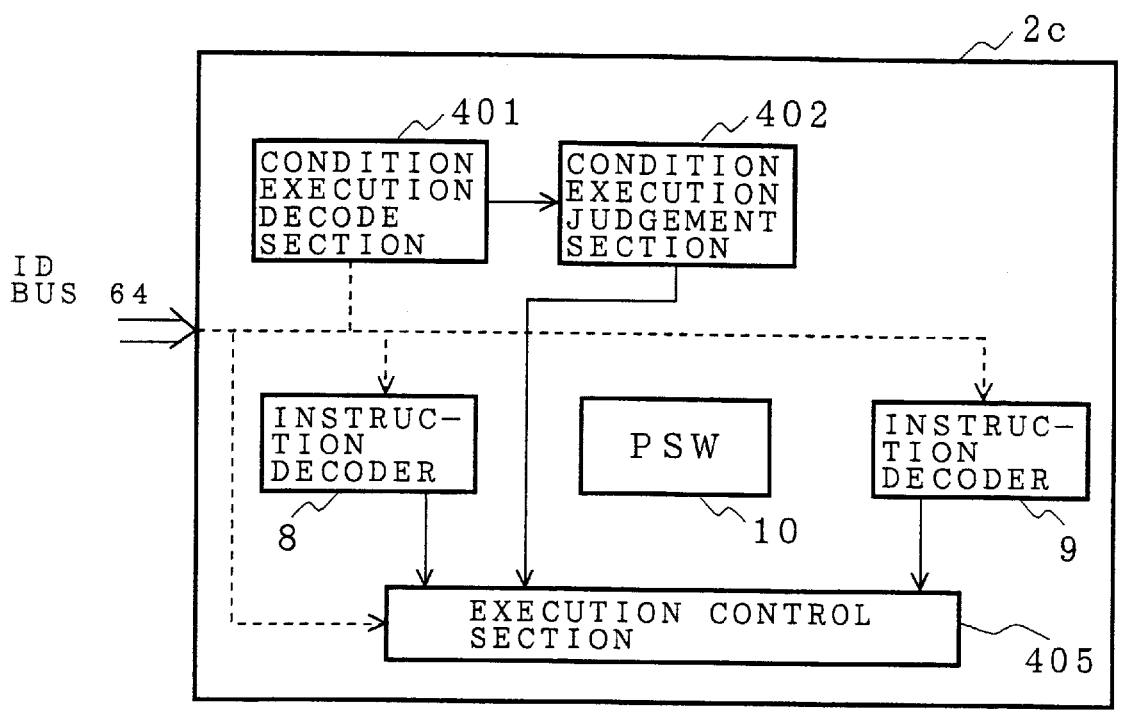

MICROPROCESSOR CAPABLE OF EXECUTING CONDITION EXECUTION INSTRUCTIONS USING ENCODED CONDITION EXECUTION FIELD IN THE INSTRUCTIONS

BACKGROUND OF THE INVENTION

1. Field of the Invention

The present invention relates to a microprocessor having condition execution instructions in which execution of an instruction is controlled by using a condition execution field included in a part of the instruction.

2. Description of Related Art

There are methods such as a condition execution method and a speculative execution method which increase performance of a microprocessor by reducing a branch penalty in a pipeline execution.

FIG. 1 is an explanation diagram showing an example of an instruction format used in a conventional RISC microprocessor shown on pages 2–29 in a family data manual of ARM (ACORN RISC MACHINE) by VLSI technology corp., for example. As shown in FIG. 1, a condition execution instruction used in this conventional microprocessor has a 4-bit condition execution field of bits #28–31. This condition execution field and a negative flag (N), a zero flag (Z), a carry flag (C) and an overflow flag (V) determine whether or not an instruction will be executed. However, because each flag to be used for decision of this condition execution is a dedicated flag, the range of a condition execution in the conventional microprocessor is limited.

FIG. 2 is an explanation diagram showing an instruction format used in another conventional microprocessor disclosed in Japanese laid-open publication number JP-A-182165.

In FIG. 2, the reference number 301 designates a condition execution field in which execution conditions will be set or described, and 302 denotes an operation field as an operation section. In the condition execution field 301, the reference numbers 303 and 304 indicate Cv0 and Cd0 bits which are related to the flag #0 in the microprocessor, respectively. The reference numbers 305 and 306 designate Cv1 and Cd1 bits which are related to the flag #1 in the microprocessor. The reference numbers 307 and 308 denote Cv2 and Cd2 bits which are related to the flag #2 in the microprocessor.

FIG. 3 is an explanation diagram showing the connection between the Cv and Cd bits and their meanings. In FIG. 3, the Cv bit includes the Cv0 bit 303, the Cv1 bit 305 and the Cv2 bit 307, as have been shown in FIG. 2. The Cd bit shown in FIG. 3 includes the Cd0 bit 304, the Cd1 bit 306 and the Cd2 bit 308, as have been shown in FIG. 2. As shown in FIG. 3, in the case where both values of the Cv0 bit 303 and the Cd0 bit 304 in the condition execution field 301 are set to 1, the condition is established so that an instruction will be executed when the value of the flag #0 is true. In the case where both values, the Cv0 bit 303 and the Cd0 bit 304 are set to 1 and zero, respectively, the condition is established so that an instruction will be executed when the value of the flag #0 is false. When both values of the Cv0 bit 303 is set to 0, the condition is established so that an instruction will be executed in spite of the state of the value of the flag #0.

The Cv1 bit 305, the Cd1 bit 306 and the flag #1 can be checked by using the relationship, as shown in FIG. 3, whether or not the execution condition to execute an instruction is established. The Cv2 bit 307, the Cd2 bit 308 and the flag #2 also be checked by using the relationship, as shown in FIG. 3, whether or not an execution condition to execute an instruction is established.

The Cv bit is a bit used for judging effectively of the condition because the judgement of true or false will be performed or not according to the value of the Cv bit. In addition, the Cd bit is a bit used for judging a value because the judgement whether it is true or false will be performed according to the value of the Cd bit.

Next, the operation of the conventional microprocessor described above will now be explained.

The conventional microprocessor can control whether or not an instruction indicated by the value stored in the operation field 302 will be executed according to the condition execution field 301 in the instruction format 300. For example, when the value "111111" is set in the condition execution field 301, the microprocessor executes the instruction indicated by the operation field 302 when all of the flag #0, the flag #1 and the flag #2 are true.

Each of the flag #0, the flag #1 and the flag #2 uses a 1-bit, for example, the value "true" can be expressed by the value "1" and the value "false" is expressed by the value "0". In the microprocessor disclosed in Japanese laid-open publication number JP-A-7-182165, each of the flag #0, the flag #1 and the flag #2 is expressed by using a 2-bit value in order to indicate the true state, the false state and the undecided state. For example, when there is a flag whose value indicates the undecided state and other conditions are established, the instruction designated by the operation field 302 will be executed. In this case, the execution result is written into a shadow register file which is different from the general registers. When all conditions are established, at this time, the content stored in the shadow register file is written into the general register files. Thereby, speculative execution is realized. In addition, Japanese laid-open publication number JP-A-7-182165 discloses a microprocessor having m-flags (m>3) in order to increase condition numbers.

Since the conventional microprocessors having condition execution instructions have the configurations and they perform as described above, the range of condition execution can be expanded, but it requires the 6-bit condition execution field 301 for 3-flags, for example. Thus, the conventional microprocessor has a drawback that the bit size or the number of bits in the condition execution field 301 is big or large.

In addition, in the microprocessor disclosed in the Japanese laid-open publication number JP-A-2-22873, an encoded value used for deciding whether or not a branch instruction or a jump instruction is performed is stored in a register and a decoded value as a value used for judging whether or not the branch instruction or a jump instruction is performed is provided from the register. However, the conventional microprocessor shown in the Japanese laid-open publication number JP-A-2-22873 does not disclose any configuration of the condition execution field in an instruction.

SUMMARY OF THE INVENTION

Accordingly, an object of the present invention is, with due consideration to the drawbacks of the conventional microprocessors, to provide a microprocessor having condition instructions in an instruction set and which is capable of performing efficiently, each of the condition instructions being capable of reducing the number of bits of the condition execution field against condition-numbers.

In accordance with a preferred embodiment according to the present invention, a microprocessor having condition execution instructions comprises an instruction decoder for decoding said condition execution instructions each having at least one or more condition execution fields and at least one or more operation fields, a control register into which information to control execution of said condition execution instructions is stored, said control register including general purpose flags into which execution conditions for said condition execution instructions are stored, and an instruction execution section for executing said condition execution instructions based on output from said instruction decoder, wherein said condition execution field in each condition execution instruction stores an encoded value obtained by encoding said execution conditions stored in said general purpose flags for indicating execution of said condition execution instructions, and said instruction decoder comprises a condition execution decode section for decoding values set in said condition execution fields, judges whether or not said decoded result obtained by said condition execution decode section is equal to said execution conditions stored in said general purpose flags, and determines said condition execution instruction is to be executed when both are equal.

In a microprocessor having condition execution instructions as another preferred embodiment according to the present invention, a first-bit length of said condition execution field is shorter than a second-bit length required for expressing all of combinations among said general purpose flags, and said condition execution decode section decodes an encoded value obtained by encoding said first-bit length.

In a microprocessor having condition execution instructions as another preferred embodiment according to the present invention, said condition execution field consists of a 3-bit length field or a 5-bit length field.

In accordance with another preferred embodiment according to the present invention, a microprocessor having condition execution instructions comprises an instruction decoder for decoding said condition execution instructions each having a condition execution field and at least one or more operation fields, a control register into which information to control execution of said condition execution instructions is stored, said control register including general purpose flags into which execution conditions for said condition execution instructions are stored, general purpose registers for storing data, and an instruction execution section for executing said condition execution instructions based on output from said instruction decoder, wherein said condition execution field stores a value indicating a register in said general purpose registers in which conditions for said general purpose flags indicating to execute said condition execution instructions, said instruction decoder comprises a register reference section for referencing a value stored in said register designated by using said condition execution field, and a condition execution judgement section for judging whether or not said condition set in said register referenced by said register reference section is equal to the execution condition indicated by said general purpose flags, and executes said condition execution instruction when both are equal.

In a microprocessor having condition execution instructions as another preferred embodiment according to the present invention, said instruction decoder decodes said condition execution instructions each instruction having a condition execution field, an instruction selection condition field and a plurality of operation fields, said instruction execution section comprises a plurality of operation circuits, said instruction decoder further comprises an execution control section for determining whether or not operations based on contents stored in said plurality of operation fields are performed according to a set value stored in said instruction selection condition field.

In a microprocessor having condition execution instructions as another preferred embodiment according to the present invention, said instruction selection condition field consists of an one-bit length field.

BRIEF DESCRIPTION OF THE DRAWINGS

These and other objects, features, aspects and advantages of the present invention will become more apparent from the following detailed description of the present invention when taken in conjunction with the accompanying drawings, in which:

FIG. 3 is an explanation diagram showing the connection between Cv and Cd bits and their meanings;

FIGS. 5A and 5B are explanation diagrams showing an instruction format used in the microprocessor shown in FIG. 4.

FIG. 6 is an explanation diagram showing detailed contents of operation fields in the instruction formats shown in FIGS. 5A and 5B;

FIGS. 7A, 7B and 7C are explanation diagrams showing a register configuration of the microprocessor shown in FIG. 4;

FIG. 8 is an explanation diagram showing a detailed content of a Processor Status Word (PSW);

FIG. 10 is an explanation diagram showing a pipeline operation at a sequential instruction execution of the microprocessor of the first embodiment shown in FIG. 4;

FIG. 13 is an explanation diagram showing execution conditions in a case that three-execution control flags are used;

FIG. 18 is a block diagram showing a configuration of an instruction decode unit for performing condition execution operation in the microprocessor of the third embodiment.

DESCRIPTION OF THE PREFERRED EMBODIMENTS

Other features of this invention will become apparent through the following description of preferred embodiments which are given for illustration of the invention and are not intended to be limiting thereof.

Preferred embodiments of the microprocessor according to the present invention will now be described with reference to the drawings.

First Embodiment

Figure 4:
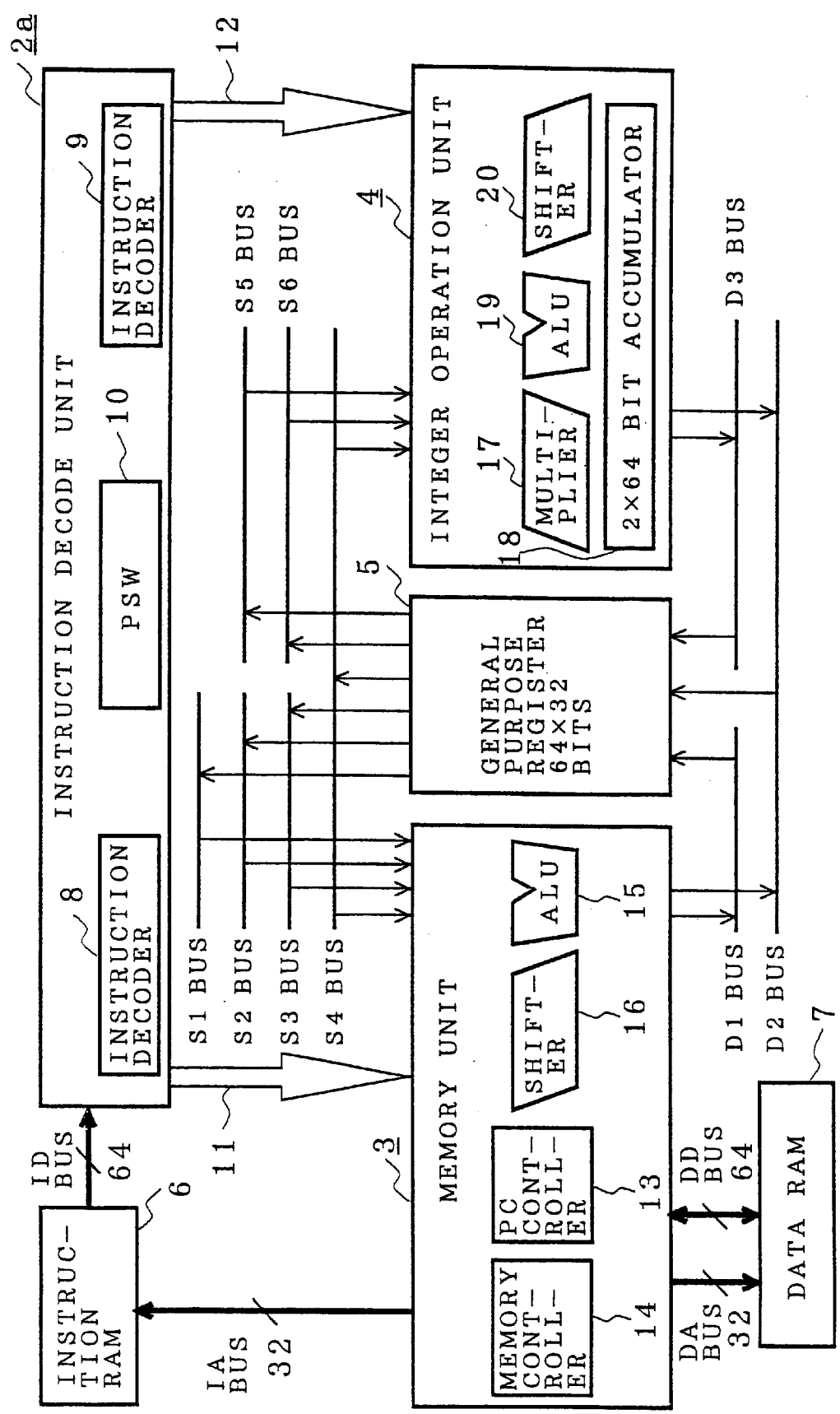
FIG. 4 is a block diagram showing a configuration of a microprocessor as a first embodiment according to the present invention.

FIG. 4 is a block diagram showing a configuration of the microprocessor of the preferred embodiments according to the present invention. This microprocessor is a 32 bit microprocessor having 32 bit internal data buses. In FIG. 4, the reference number 2 designates an instruction decode unit (instruction decoder) for decoding instruction codes transferred from an instruction RAM 6 through a ID bus of a 64 bit width, 3 denotes a memory unit for performing address calculation operations, 4 indicates an integer arithmetic or operation unit (instruction execution section) for performing a logic operation and a shift operation, 5 designates a general purpose register consisting of 32 bits×64 words, and reference number 7 indicates a data RAM for storing data.

In the instruction decode unit 2, reference numbers 8 and 9 designate instruction decoders each of which decodes instructions, and reference number 10 indicates a Processor Status Word (hereinafter the processor status word will be referred to as "PSW") for indicating the state of a microprocessor. The instruction decode unit 2 generates a control signal 11 by using a decode result of the instruction decoder 8 and the content of the PSW 10 and then provides the control signal 11 to the memory unit 3. In addition, the instruction decode unit 2 further generates a control signal 12 based on a decode result of the instruction decoder 9 and the content of the PSW 10 and then transfers the control signal 12 to the integer arithmetic unit 4.

In the memory unit 3, the reference number 13 designates a Program Counter (PC) control section or PC controller for calculating a new PC value obtained by adding a current PC value by eight for an instruction to be executed in a following step when an instruction, not including jump and branch operations, is executed, for adding a current PC value by a branch displacement during execution of an instruction, including jump and branch operations, and for calculating a PC value, according to an addressing mode designated in the arithmetic operation, to be used for a target instruction indicated by a jump operation.

The PC control section 13 transfers the calculated PC value to the instruction RAM 6 through an Instruction Access (IA) bus of a 32-bit bus width in order to output an instruction code from the instruction RAM 16. The reference number 14 denotes a memory control section for controlling access operations to data that will become an operand. This memory control section 14 transfers an address data to the data RAM 7 through a DA bus of a 32-bit bus width in order to access data which is required for execution of the instruction from the data RAM 7 through a DD bus of a 64-bit bus width. The reference number 15 designates an arithmetic Logic Unit (ALU) for executing arithmetic logic operations by using a maximum of 3 word data transferred from the general purpose register 5 through S1, S2 and S3 buses, each bus having a 32-bit bus width, and for transferring operation results to the general purpose register 5 through a D1 bus of a 32-bit bus width. The reference number 16 denotes a shifter for executing a shift operation by using data transferred from the general purpose register 5 through the S1, S2 and S3 buses and then for transferring an operation result to the general purpose register 5 through the D1 bus.

The microprocessor of the first embodiment can transfer four words, each word being a 32-bit length, through the S1, S2, S3 and S4 buses at the same time. Accordingly, for example, the following two operations can be executed at the same time: data stored in the third register is stored into a memory field addressed by a sum of data items stored in both the first and second registers; and a content stored in the fourth register is stored into a memory field addressed by a value obtained by adding the address of a memory field, into which the content in the third register has been stored, by a predetermined value. Furthermore, the memory unit 3 can transfer an arithmetic result of two word data executed in the memory unit 3 or two word data transferred from the data RAM 7 into the general purpose register 5.

In the integer arithmetic operation unit 4, the reference number 17 designates a multiplier for executing multiplication operations of a maximum of three word data transferred from the general purpose register 5 through the 32 bit buses such as the S4, S5 and S6 buses and for transferring operation results to the general purpose register 5 through the 32 bit buses such as the D2 and D3 buses. The reference number 18 indicates an accumulator (ACC) for accumulating arithmetic results and then storing the accumulated data or for subtracting arithmetic results and then storing the subtracted result. In the microprocessor of the preferred embodiment, two 64-bit accumulators are incorporated. The reference number 19 designates an arithmetic logic unit (ALU) for performing arithmetic logic operations by using a maximum of 3 word data items transferred from the general purpose register 5 through the S4, S5 and S6 buses and then for transferring arithmetic results to the general purpose register 5 through the D2 and D3 buses. The reference number 20 indicates a shifter for performing shift operations by using data transferred from the general purpose register 5 through the S4, S5 and S6 buses and then for transferring operation results to the general purpose register 5 through the D2 and D3 buses.

The microprocessor of the preferred embodiment can read maximum of six kinds of register values from the general purpose register 5. The readout data items are transferred onto the S1, S2, S3, S4, S5 and S6 buses. In addition, a maximum of three kinds of register values can be written into the general purpose register 5 through the D1, D2 and D3 buses at the same time.

FIGS. 5A and 5B are diagrams explaining instruction formats used in the microprocessor of the first embodiment according to the present invention shown in FIG. 4.

The microprocessor of the preferred embodiment according to the present invention has a two-instruction format 101 and a single instruction format 102 shown in FIG. 5A and FIG. 5B, respectively. The two instruction format 101 indicates two operations. The single instruction format 102 indicates one instruction. The two-instruction format 101 includes a format field consisting of fields 103 and 104, two operation fields 106 and 107 and two 3-bit CC fields 105 (or execution condition fields) corresponding to the operation fields 106 and 107, respectively.

The single instruction format 102 has a format field consisting of fields 103 and 104, an operation field and a 3-bit CC field 105 (or execution condition field) corresponding to the operation field. The operation field consists of fields 108, 109 and 110.

The format fields 103 and 104 forming the format field are defined as follows:

| Code in Format | Number of | Issuing order | |
|---|---|---|---|
| FM | Instructions | Operation_0 | Operation_1 |
| 00 | two | 1st | 1st |
| 01 | two | 1st | 2nd |
| 10 | two | 2nd | 1st |
| 11 | one | 1st | — | where FM indicates a two-bit value stored in the fields 103 and 104.

When FM=00, the instruction to be executed is a two-operation instruction. In this case, both of two instructions, the operation_0 indicated by the operation field 106 and the operation_1 indicated by the operation field 107, are executed concurrently in parallel in a clock cycle immediately after a decoding operation. The operation_0 is executed in the memory unit 3 and the operation_1 is performed in the integer arithmetic operation unit 4.

When FM=01, an instruction to be executed is a two-operation instruction. In this case, the operation_0 is executed in a clock cycle immediately after a decoding operation and the operation_1 is executed in a clock cycle which is delayed from the execution of the operation_0 by one clock cycle.

When FM=10, an instruction to be executed is a two operation instruction. In this case, the operation_1 is executed in a clock cycle immediately after decoding operation and then the operation_0 is executed in a clock cycle which is delayed from the execution cycle of the operations by one cycle.

When FM=11, an instruction to be executed is a single operation instruction. In this case, the operation indicated by using the operation field consisting of the fields 108, 109 and 110 is executed in a clock cycle immediately after decoding cycle.

The 3-bit CC field 105 (or the execution condition field) is defined as follows:

| | Code | Conditions to be executed |
|---|---|---|
| CC= | 000 | Always |
| | 001 | F0 = T and F1 = don't care |
| | 010 | F0 = F and F1 = don't care |
| | 011 | F0 = don't care and F1 = T |
| | 100 | F0 = don't care and F1 = F |
| | 101 | F0 = T and F1 = T |
| | 110 | F0 = T and F1 = F |
| | 111 | Reserved |

The 3-bit CC field 105 (or the execution condition field) determines whether the execution of the operation_0 in the operation fields 106 and 107, the execution of the operation_1 and the operations of the operation fields 108, 109 and 110 are valid or invalid based on the status of the F0 and F1 flag bits as execution control flags. The execution control flags F0 and F1 will be explained later in detail.

A valid status of the operation means that the operation results are written into the registers, the memories and the flags so that the operation results are stored in them. An invalid status of the operation means that the operation results are not written into the registers, the memories and the flags, so that the operation results are not stored in them, as if a NOP instruction has been executed.

When the value CC of the execution condition field 105 is zero (CC=000), the operation always become valid in spite of the values of the operation control flags F0 and F1.

When CC=001, the operation becomes valid only when the execution control flag F0=truth. In this case, the state of the execution control flag F1 does not matter.

When CC=010, the operation becomes valid only when F0=false. In this case, the status of the F1 flag does not matter.

When CC=011, the operation becomes valid only when F1=truth. In this case, the status of the F0 flag does not matter.

When CC=100, the operation becomes valid only when F1=false. In this case, the status of the F0 flag does not matter.

When CC=101, the operation becomes valid only when F0=truth and F1=truth.

When CC=110, the operation becomes valid only when F0=truth and F1=false.

When CC=111, any user can not use an instruction based on CC=111 because operation under CC=111 is undefined.

FIG. 6 is a diagram explaining detailed contents of operation fields 106 to 110 in the instruction formats 101 and 102 shown in FIGS. 5A and 5B.

Each of the short formats 111 to 117 comprises a 28-bit short type operation field 106 or 107. Each of the length formats 118 and 119 comprises a 54-bit length type operation fields 108, 109 or 110.

The format 111 (Short M, see FIG. 6) consists of the field 120 (an 8-bit opcode field) designating a content of operation, the two fields 121 and 122 (two 6-bit register specifier fields Ra and Rb) each designating a register number, the field 123 (a 6-bit register specifier field) for specifying a register number or an immediate value and the field 124 (a 2-bit operand identifier X) for indicating the kind of a content stored in the field 123.

As shown in FIG. 6, when the value X stored in the field 124 is 00, 01 or 11, the content of the field 124 indicates that the field 123 stores a register number. When the value of the field 124 is 10, the content in the field 123 indicates that the field 123 stores an immediate value. This format 111 is used for load-store instructions such as memory access operations with register indirect addressing modes.

The format 112 (Short A, see FIG. 6) consists of the field 120 (an 8-bit opcode field) designating a content of operation, the two fields 121 and 122 (two 6-bit register specifier fields Ra and Rb) each designating a register number, the field 123 (a 6-bit register specifier field) for indicating a register number or an immediate value and the field 125 (a 1-bit operand identifier Y) for indicating the kind of a content stored in the field 123.

As shown in FIG. 6, when the value X' stored in the field 125 is "0", the content in the field 125 indicates that the field 123 designates a register number and when the value X' is "1", the content in the field 125 indicates that the field 123 stores an immediate value. This format 112 is used for load-store instructions, such as arithmetic operations, logic operations, shift operations and so on, with register indirect addressing modes.

The format 113 (Short B1) consists of the field 113 (a 8-bit opcode field) designating a content of operation and the field 126 (a 6-bit register specifier Rc field) for specifying a register number. This format 113 is used for jump and branch instructions with a register address (Rc).

The format 114 (Short B2) consists of a field 120 (an 8-bit opcode field) designating a content of operation and a field 127 of a 18-bit displacement (a 18-bit displacement field).

This format 114 is used for jump and branch instructions with an immediate 18-bit displacement.

The format 115 (Short B3) consists of the field 120 (an 8-bit opcode field) for designating a content of operation, the field 121 (a 6-bit register specifier Ra field) for designating a register number, the field 128 for designating a register number or an immediate value of a 12-bit length, the field 129 for indicating that the field 128 stores the register number or the immediate value, and the field 130 for indicating either a conditional jump operation or a conditional branch operation is performed based on the content in the field 121 of a zero judgement. This format 115 is used for conditional jump instructions and conditional branch instructions.

The format 116 (Short D1) consists of the field 120 (an 8-bit opcode field) for designating a content of operation, the field 121 (a 6-bit register specifier Ra field) for designating a register number, the field 128 for designating a register number or an immediate value of a 12 bit length and the field 129 (a 1-bit operand identifier Y field) for identifying whether the content in the field 128 is the register number or the immediate value. This format 116 is used for conditional jump instructions, conditional branch instructions and repeat instructions.

The format 117 (Short D2) consists of the field 120 (an 8-bit opcode field) for designating a content of operation, the field 128 for designating a register number or an immediate value of a 12-bit length, the field 129 (a 1-bit operand identifier Y field) for indicating whether the content in the field 128 is the register number or the immediate value and the field 131 (a 6-bit displacement field ct:6) used for delayed instructions. This format 117 is used for delayed jump instructions, delayed branch instructions and repeat instructions.

The format 118 (Long 1) consists of the field 120 (an 8-bit opcode field) for designating a content of operation, the two fields 121 and 122 for designating register numbers and the field 132 for designating an immediate value of a 32-bit length. This format 118 is used for all instructions that take a 32-bit immediate operand such as complicated arithmetic operations, arithmetic operations using a large immediate value, memory access operation of register relative indirect addressing with a large-bit displacement, branch instructions with a largedisplacement and jump instructions to absolute addresses (or unsigned addresses).

The format 119 (Long 2) consists of the field 120 (an 8-bit opcode field) for identifying a content of operation, the two fields 121 and 122 for designating register numbers, the field 132 for designating an immediate value of a 32-bit length and the field 133 for indicating whether either a conditional jump operation or a conditional branch operation is performed based on the content in the field 121 of a zero judgement. This format 119 is used for condition jump instructions and condition branch instructions with a large branch displacement.

FIGS. 7A, 7B and 7C are explanation diagrams showing a register configuration in the microprocessor as the first preferred embodiment shown in FIG. 4.

The microprocessor of the first embodiment shown in FIG. 4 comprises the general purpose register 5 including sixty-four 32-bit general purpose registers shown in FIG. 7A, twelve control registers 150 and two accumulators 18 shown in FIG. 7C. The value in the general purpose register R0 is always zero. Therefore writing data into the register R0 is negligible.

The general purpose register R62 is a link register in which a return address from a subroutine is set. The general purpose register R63 is a stack pointer operating as a user stack pointer (USP) or an interrupt stack pointer (SPI) according to a value of a SM field in the PSW 10. The control register 150 comprises a program counter 151, the PSW 10 and various kinds of dedicated registers.

In operations using the format 112 shown in FIG. 6, the upper 16 bits and the lower 16 bits in each of the 64 general purpose registers 5 can be used independently.

Figure 1:
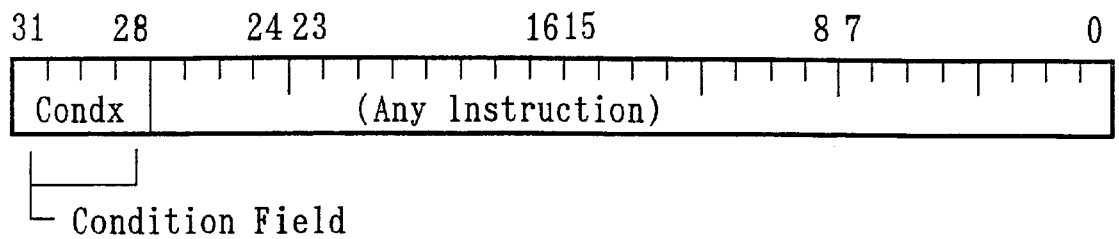
FIG. 1 is an explanation diagram showing an example of an instruction format used in a conventional RISC microprocessor.

FIG. 8 is a diagram showing detailed contents of the PSW 10 in the microprocessor as a preferred embodiment according to the present invention shown in FIG. 1.

As shown in FIG. 8, the upper 16 bits 170 in the PSW 10 includes the SM field 171 for switching the stack pointer, the EA field 172 for showing a detection result of self-debug trap (SDBT), the DB field 173 for indicating allowance (enabled) of the SDBT, the IE field 174 for indicating an interrupt allowance, the RP field 175 for indicating an allowance (enabled) of repeat operation and the MD field 176 for indicating an allowance (enabled) of modulo addressing. The lower 16 bits 180 includes 8 flags. The F0 flag 181 and F1 flag 182 (execution control flags) indicate whether an operation is valid or invalid. A value of each flag is changed according to results of comparison operation and arithmetic operations, or according to initializing operations for these flags, or by writing an optional value into the flag field 180 in flag writing operations. Contents in the flag field 180 are read out by flag-value readout operation.

Each flag in the flag fields 170 and 180 is defined as follows:

SM=0 :Stack mode 0→SPI is used
SM=1 :Stack mode 1→SPI is used
EA=0 :SDBT is not detected
EA=1 :SDBT is detected
DB=0 :SDBT is not accepted
DB=1 :SDBT is accepted
IE=0 :Interrupts are masked
IE=1 :Interrupts are accepted.
RP=0 :A block repeat is inactive
RP=1 :A block repeat is active
MD=0 :Modulo addressing is disabled
MD=1 :Modulo addressing is enable
F0 :general purpose flag (execution control flag)
F1 :general purpose flag (execution control flag)
F2 :general purpose flag
F3 :general purpose flag
F4(S) :Saturation operation flag
F5(V) Overflow flag
F6(VA) Accumulated overflow flag
F7(C) :Carry/Borrow flag Hereinafter, the instruction list of the microprocessor will be described.

Figure 9:
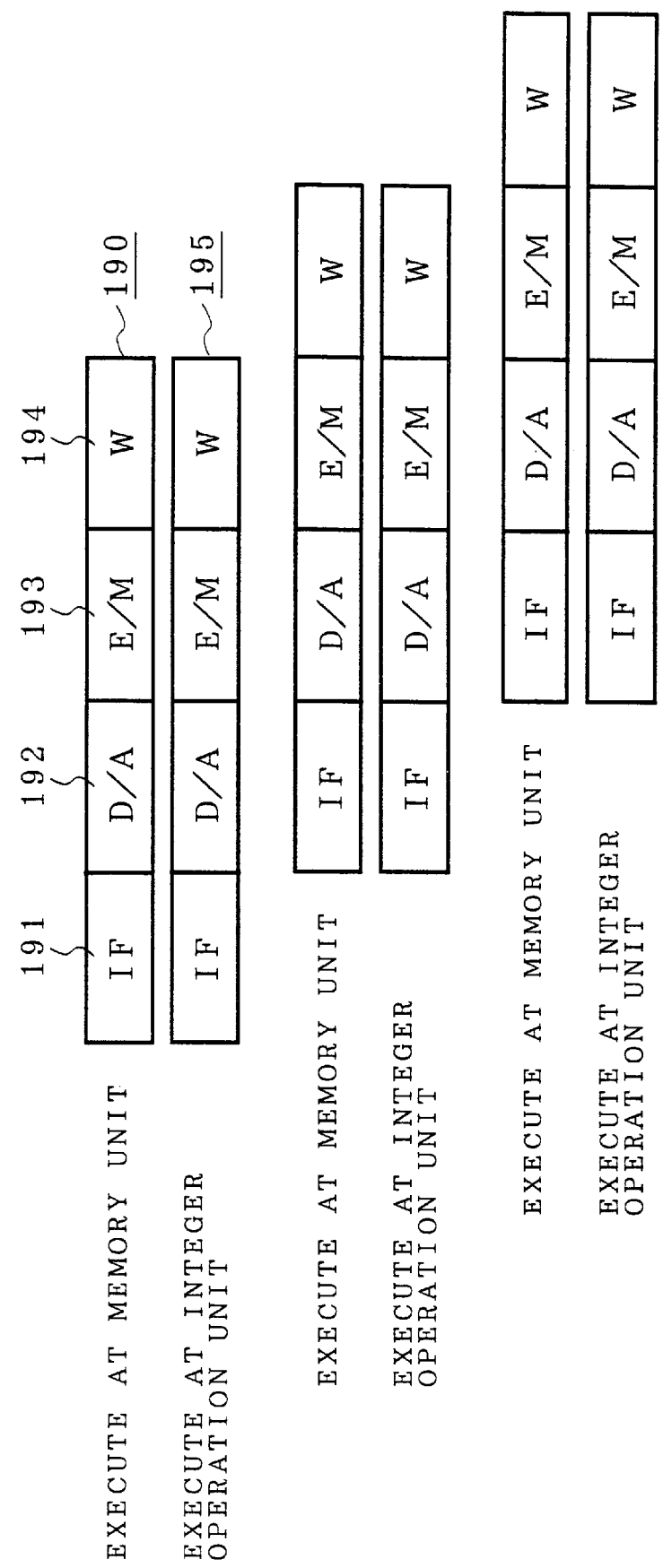
FIG. 9 is an explanation diagram showing a pipeline operation during a parallel execution of two-instructions in the microprocessor of the first embodiment shown in FIG. 4.

A. Microprocessor function instructions
  A-1. Load/Store instructions
LDB :Load one byte to a register with sign extension
LDBU :Load one byte to a register with zero extension
LDH :Load one half-word to a register with sign extension
LDHH :Load one half-word to a register high
LDHU :Load one half-word to a register with zero extension
LDW :Load one word to a register
LD2W :Load two words to registers
LD4BH :Load four bytes to four half-words in two registers with sign extension
LD4BHU :Load four bytes to four half-words in two registers with zero extension LD2H :Load two half-words to two words in two registers with sign extension
STB :Store one byte from a register
STH :Store one half-word from a register
STHH :Store one half-word from a register high
STW :Store one word from a register
ST2W :Store two words from registers
ST4HB :Store four bytes from four half-words from two registers
ST2H :Store two half-words from two registers
MODDEC :Decrement a register value by a 5-bits immediate value
MODINC :Increment a register value by a 5-bits immediate value A-2. Transfer instructions
MVFSYS :Move a control register to a general purpose register
MVTSYS :Move a general purpose register to a control register
MVFACC :Move a word from an accumulator
MVTACC :Move two general purpose registers to an accumulator A-3. Compare instructions
CMPcc :Compare
    cc=EQ (equal), NE (not equal), GT (greater than), GE (greater than or equal), LT (less than), LE (less than or equal), PS (both positive), NG (both negative)
CMPcc :Compare unsigned
    cc=GT, GE, LT, LE A-4. Maximum/Minimum instructions reserved
A-5. Arithmetic operation instructions
ABS :Absolute
ADD :Add
ADDC Add with carry
ADDHppp :Add half-word
    ppp=LLL (register lower, register lower, register lower), LLH (register lower, register lower, register higher), LHL, LHH, HLL, HLH, HHL, HHH
ADDS :Add register Rb with the sign of the third operand
ADDS2H :Add sign to two half-words
ADD2H :Add two pairs of half-words
AVG :Average with rounding towards positive infinity
AVG2H :Average two pairs of half-words rounding towards positive infinity
JOINpp :Join two half-words
    pp=LL, LH, HL, HH
SUB :Subtract
SUBB :Subtract with borrow
SUBHppp :Subtract half-word ppp=LLL, LLH, LHL, LHH, HLL, HLH, HHL, HHH
SUB2H :Subtract two pairs of half-words A-6. Logical operation instructions
AND :logical AND
OR :logical OR
NOT :logical NOT
XOR :logical exclusive OR
ANDFG :logical AND flags
ORFG :logical OR flags
NOTFG :logical NOT a flag
XORFG :logical exclusive OR flags A-7. Shift operation instructions
SRA :Shift right arithmetic
SRA2H :Shift right arithmetic two half-words
SRC :Shift right concatenated registers
SRL :Shift right logical
SRL2H :Shift right logical two half-words
ROT :Rotate right
ROT2H :Rotate right two half-words A-8. Bit operation instructions
BCLR :Clear a bit
BNOT :Invert a bit
BSET :Set a bit
BTST :Test a bit A-9. Branch instructions
BRA :Branch
BRATZR :Branch if zero
BRATNZ :Branch if not zero
BSR :Branch to subroutine
BSRTZR :Branch to subroutine if zero
BSRTNZ :Branch to subroutine if not zero
JMP :Jump
JMPTZR :Jump if zero
JMPTNZ :Jump if not zero
JSR :Jump to subroutine
JSRTZR :Jump to subroutine if zero
JSRTNZ :Jump to subroutine if not zero
NOP :No Operation
[Instructions related to Delayed branch, Jump instructions]
DBRA
DBSR
DBSRI
DJMP
DJMPI
DJSR
DJSRI A-10. OS-related instructions
TRAP :Trap
REIT :Return from exception, interrupts and traps B. DSP function instructions
B-1. Arithmetic operation instructions
MUL :Multiply
MULX :Multiply with extended precision
MULXS :Multiply and shift to the right by one with extended precision
MULX2H :Multiply two pairs of half-words with extended precision
MULHXpp :Multiply two half-words with extended precision pp=LL, LH, HL, HH
MUL2H :Multiply two pairs of half-words
MACa :Multiply and add a (designated by accumulator)=0, 1
MACSa :Multiply, shift to the right by one and add a=0, 1
MSUBa :Multiply and subtract a=0, 1
MSUBSa :Multiply, shift to the right by one and subtract a=0, 1
[Instructions related to saturate operations]
SAT
SATHH
SATHL
SATZ
SATZ2H
SAT2H B-2. Repeat instructions
REPEAT :Repeat a block of instructions
REPEATI :Repeat a block of instructions immediate FIG. 9 is an explanation diagram showing a pipeline operation during a parallel execution of two-instructions in the microprocessor of the first embodiment shown in FIG. 4.

This pipeline operation is executed when the value FM of the format field in the instruction is zero, that is, when FM=00. Each of the pipelines 190 and 195 consist of an instruction fetch stage 191, a decode/address operation stage 192, an execution/memory access stage 193, and a write back stage 194. During the execution operation of two instruction in parallel, both the execution in the memory unit 3 and the execution in the integer operation unit 4 are performed at the same time.

FIG. 10 is an explanation diagram showing a pipeline operation during the execution of a sequential instruction in the microprocessor of the first embodiment shown in FIG. 4. This pipeline operation is performed when the value of the instruction format field has one of the three-values 01, 10 and 11, that is when FM=01, 10 or 11. The pipeline 200 comprises an instruction fetch stage, a decode/address operation stage, an execution/memory access stage and a write-back stage. In this case shown in FIG. 10, one of the execution in the memory unit 3 and the execution in the integer operation unit 4 is executed at a time.

Figure 11:
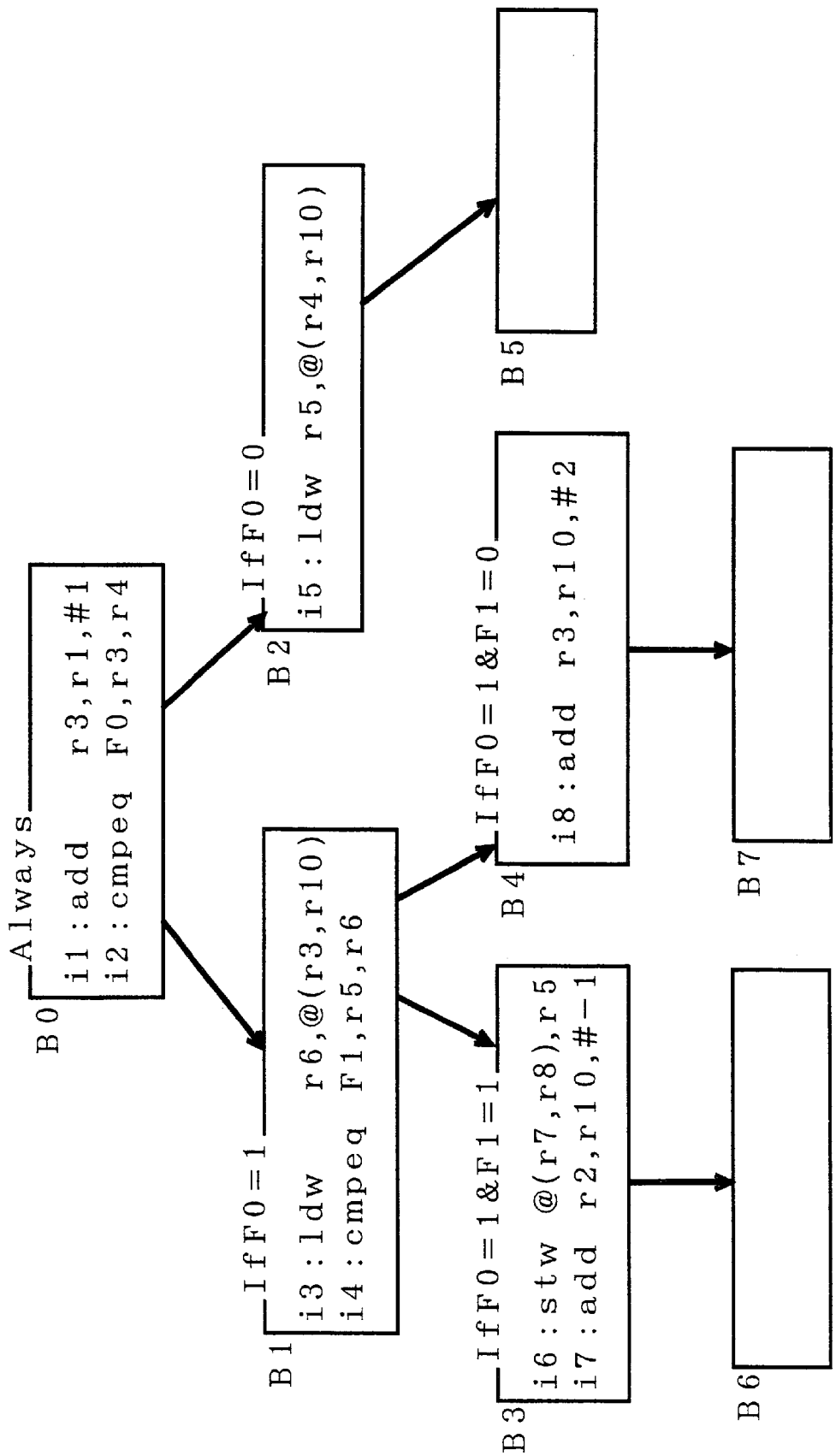
FIG. 11 is an explanation diagram showing an example of a program using condition execution.

FIG. 11 is an explanation diagram showing an example of a program using condition execution. In FIG. 11, an instruction group B0 comprising the instructions i1 and i2 will be executed in spite of the value of the flags. The execution of the instruction i1 stores a value that is obtained by adding the value of the register r1 by 1 into the register r3. The instruction i2 compares the content of the register r3 with the content of the register r4, and the execution control flag F0 is set when both contents are equal to each other. An instruction group B1 consisting of the instructions i3 and i4 will be executed when the execution control flag is 1, that is F0=1. When the instruction group B1 is executed, a 1-word data item is loaded into the register r6 from the memory field addressed by using a memory address that is the sum of the values of the register r3 and the register r10.

The contents of the registers r5 and r6 are compared when the instruction r4 is executed. When both contents are equal, the execution control flag F1 is set. An instruction group B3 consisting of the instructions i6 and i7 is executed when both of the execution control flags F0 and F1 are 1, respectively, that is F0=1 and F0=1. An instruction group B2 consisting of the instruction i5, is executed when the execution control flag F0 is 0, that is F0=0. In addition, an instruction group B4 consisting of the instruction i8 is executed when the execution control flags F0 and F1 are 1 and 0, respectively, that is F0=1 and F1=0.

Figure 12:
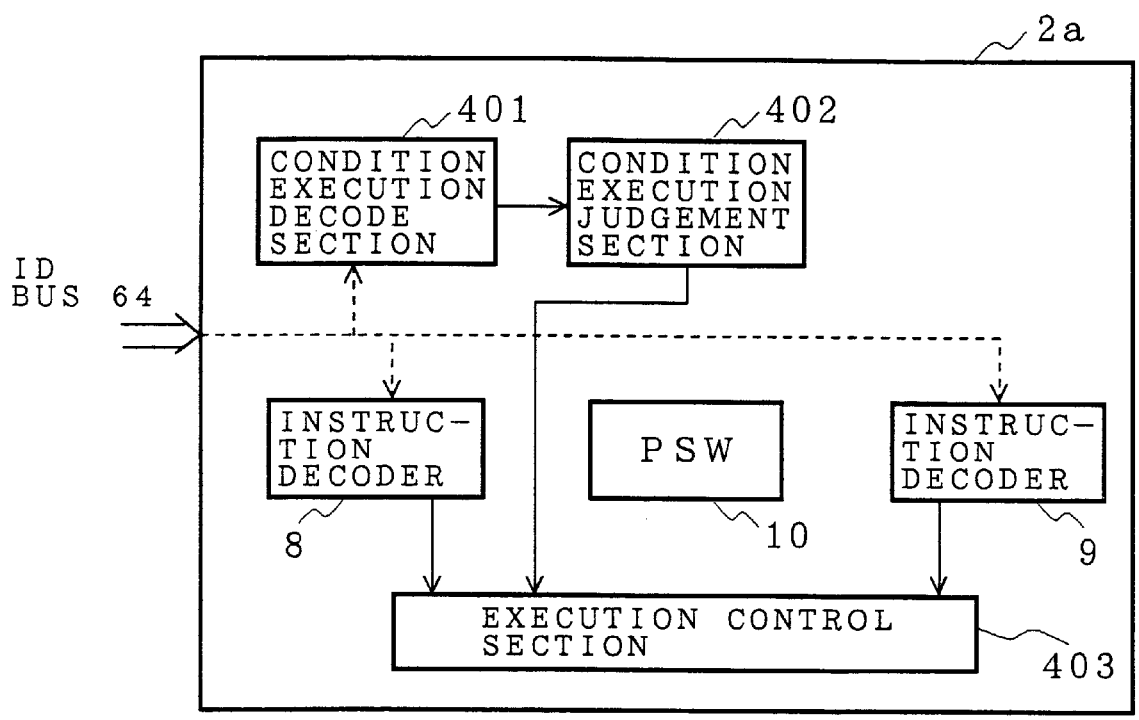
FIG. 12 is a block diagram showing a configuration for performing a condition execution in an instruction decode unit in the microprocessor of the first embodiment according to the present invention.

FIG. 12 is a block diagram showing a configuration for performing a condition execution in an instruction decode unit 2a in the microprocessor of the first embodiment shown in FIG. 4. In FIG. 12, the reference number 401 designates a condition execution decode section for decoding the content of the condition execution field 105 in an instruction, 402 denotes a condition execution judgement section for comparing the decoded value CC with the execution control flags F0 and F1, and 403 indicates an execution control section for controlling the execution of the instruction according to the comparison result obtained by the condition execution judgement section 402. Other components in the instruction decode unit 2a are equal to, in configuration and operation, the components in the instruction decode unit 2 shown in FIG. 4, therefore, the explanation for those is omitted here for brevity.

Next, the operation of the instruction decode unit 2a will be explained.

In the instructions i1 and i2 shown in FIG. 11, the value "000" is set into the condition execution field 105 in an instruction. The condition execution decode section 401 extracts a value contained in the condition execution field 105 in the instruction. Then, the extracted 3-bit value CC is decoded into data corresponding to the execution control flag F0 and into data corresponding to the execution control flag F1. When the 3-bit value CC is "000", as has been explained above, this code indicates to always execute the instruction. Then, the instruction decode unit 2a outputs data for indicating to neglect the value of the execution control flag F0 and data to neglect the value of the execution control flag F1. The condition execution judgement section 402 compares those data items with the execution control flags F0 and F1. In this case, because those control flags F0 and F1 are neglected, the condition execution judgement section 402 outputs an indication to execute the instruction to the execution control section 403. The execution control section 403 outputs control signals 11 and 12 to the memory unit 3 or the integer operation unit 4.

For example, instructions i6 and i7 in the instruction group B3, the value "101" is set in the condition execution field 105 according to the indication from the condition execution judgement section 402. The condition execution decode section 401 decodes the 3-bit value CC into data corresponding to the execution control flag F0 and data corresponding to the execution control flag F1.

As described above, this code "101" means to execute the instruction when the execution control flag F0 is true and the execution control flag F1 is true. Here, we define that true is 1. The condition execution decode section 401 outputs data indicating the execution control flag F0=1 and data indicating the execution control flag F1=1 as the execution condition. The condition execution judgement section 402 compares those data items with the execution control flags F0 and F1. When the execution control flags F0 is 1 and F1 is 1, the condition execution judgement section 402 transfers a control signal to the execution control section 403 in order to execute the instruction.

FIG. 13 is an explanation diagram showing execution conditions in a case that three-execution control flags are used. As shown in FIG. 13, the case has the $3^3$-conditions. It is required to use 5-bits as the decoded CC value in order to satisfy all the $3^3$-conditions. That is, the bit-length of the condition execution field 105 in an instruction has 5-bits. For example, when CC="000000", an instruction will be executed only when the execution control flags F0 is true), F1 is true and F2 is true.

In this case, the execution condition decode section 401 extracts the condition execution field 105 in the instruction and then decodes the extracted 5-bit value CC into data corresponding to the execution control flag F0, data corresponding to the execution control flag F1, and data corresponding to the execution control flag F2. The execution condition judgement section 402 compares those data items with the execution control flags F0, F1 and F2, and then outputs the indication to the execution control section 403 in order to execute the instruction when those are equal.

As described above, the condition execution field 105 stores the condition which is encoded in order to perform the condition execution operation. Accordingly, to use the 5-bit condition execution field 105 can designate all combinations among the three-control flags F0, F1 and F2.

Figure 2:
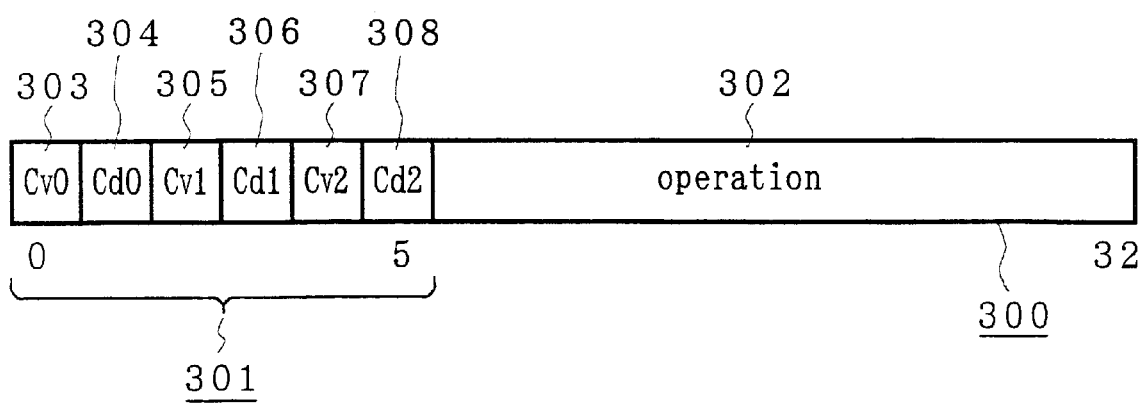
FIG. 2 is an explanation diagram showing an instruction format used in another conventional microprocessor.

In the conventional microprocessor shown in FIG. 2, although it must be required to use the 6-bit condition execution field 301 in order to designate $3^3$ conditions, the microprocessor of the first embodiment requires only the 5-bit condition execution field 105 to perform the same operations. Therefore it can be achieved to increase the bit-number used for the operation field and this makes it possible to increase the number of instructions in the instruction set in the microprocessor.

When the number of the control flags is two, the flags F0 and F1, the number of combined-conditions (true, false and a don't care (neglected) becomes $3^3$ (=9). Although the 3-bit condition execution field 105 is shown in the explanation for the instruction formats of FIGS. 5A and 5B, the 4-bit condition execution field 105 must be required to realize all of the 9-conditions. However, it is convenient for users to use the operation field having the increased bit-length and to use the condition execution field 105 having the decreased bit-length than that all of the conditions are provided to users by extending the bit-length of the condition execution field 105.

As described above, even if the number of the execution control flags F0 and F1 is two, the 3-bit execution condition field 105 can be defined in the microprocessor according to the present invention.

Figure 14:
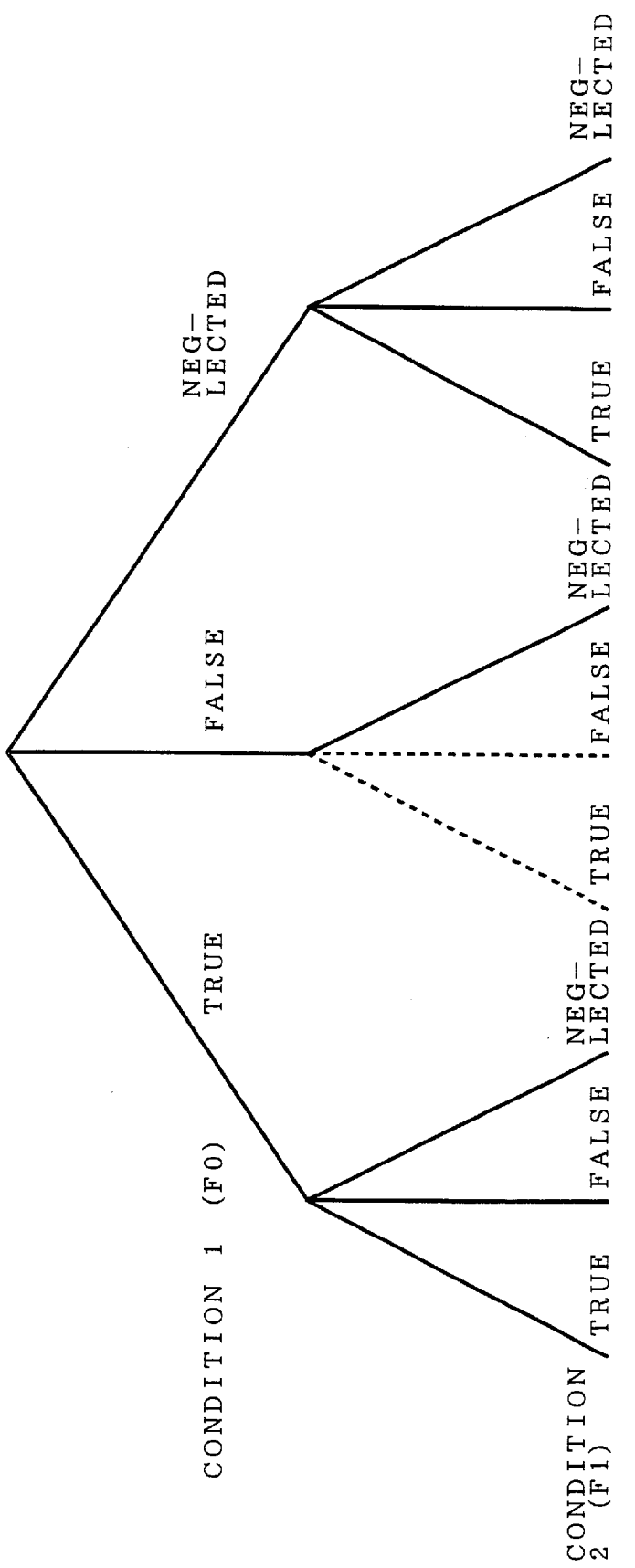
FIG. 14 is an explanation diagram showing a method of setting execution condition in a case that two-execution control flag are used.

FIG. 14 is an explanation diagram showing a method of setting execution condition in the case that the two-execution control flags are used. The number of the combinations designated by the solid lines other than available combinations as substitute shown by the dotted lines is seven for all combinations, as shown in FIG. 14. The conditions of the execution control flags F0=false and F1=true, and F0=false and F1=false can be substituted by the conditions execution control flags F0=true and F1 true for users. The seven conditions shown in the explanation in FIGS. 5A and 5B are defined by using the manner described above.

As described in detail, to limit the kinds of the execution conditions can further increase the number of bits allocated for the operation field in an instruction.

Embodiment 2.

Figure 15:
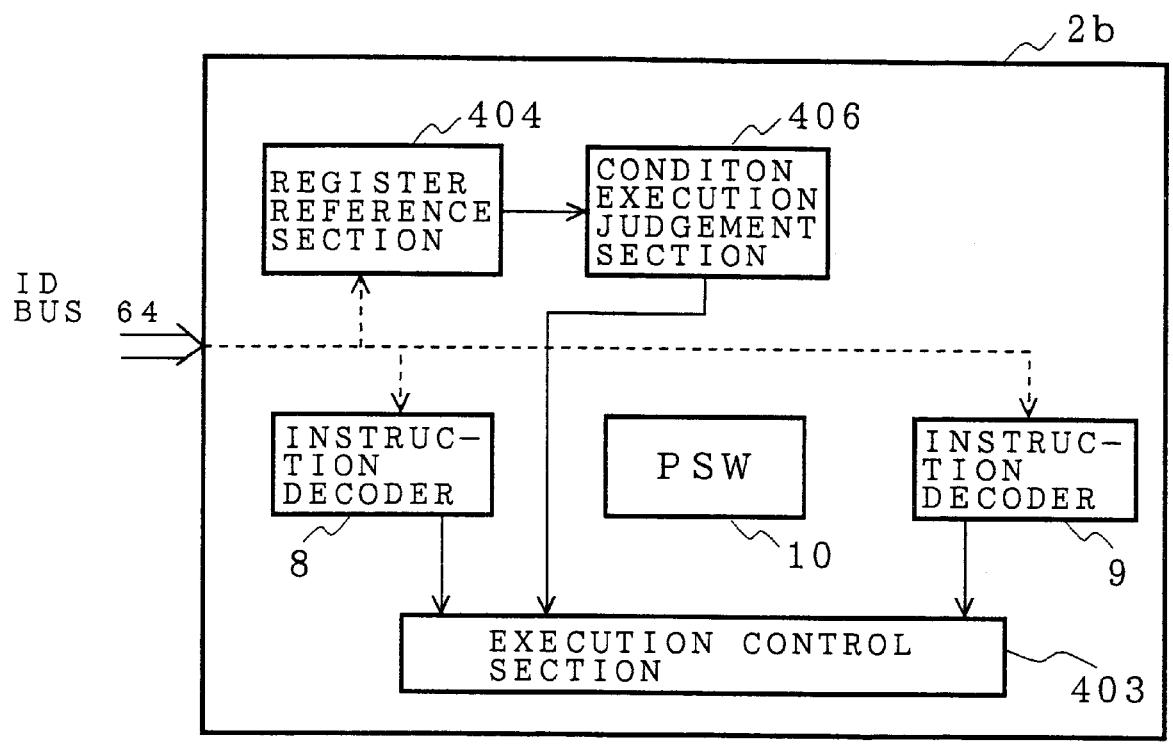
FIG. 15 is a block diagram showing a configuration for performing a condition execution in an instruction decode unit incorporated in a microprocessor as the second embodiment according to the present invention.

FIG. 15 is a block diagram showing a configuration for performing a condition execution in an instruction decode unit 2b incorporated in the microprocessor as the second embodiment according to the present invention. In the diagram, the reference number 404 designates a register reference section for referencing a target register based on the value of the 3-bit condition execution field 105 in an instruction, 406 denotes a condition execution judgement section for judging an execution condition based on a set value in the referenced register. Other components in the instruction decode unit 2b are equal to, in configuration and operation, the components in the instruction decode unit 2a shown in FIG. 12, therefore, the explanation for those is omitted here for brevity.

Next, the operation of the instruction decode unit 2b in the microprocessor of the second embodiment will be explained.

The condition execution field 105 in the instruction which is executed currently has the following meanings:

| Code | Conditions to be executed |
| --- | --- |
| CC= 000 | Always |
| 001 | Designated by R1 |
| 010 | Designated by R2 |
| 011 | Designated by R3 |
| 100 | Designated by R4 |
| 101 | Designated by R5 |
| 110 | Designated by R6 |
| 111 | Reserved |

That is, the condition execution field 105 designates an execution condition by using the general purpose register 5 indirectly.

Figure 16:
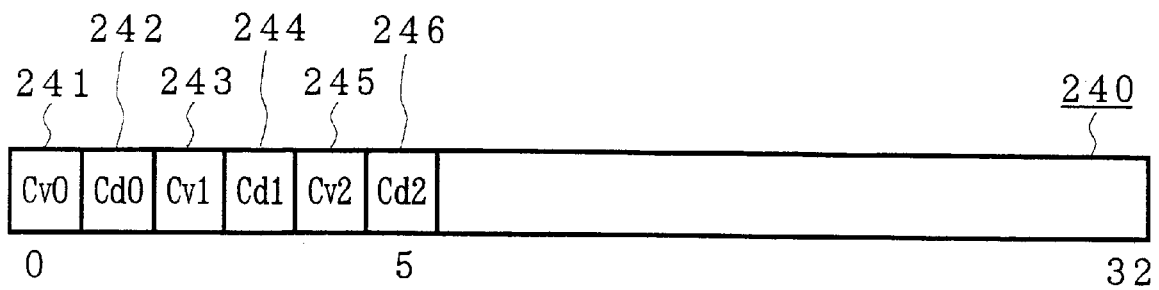
FIG. 16 is an explanation diagram showing contents in a register indicating combination conditions of flags.

FIG. 16 is an explanation diagram showing contents in the register 240 indicating combination conditions of flags.

The execution conditions indicated by each bit in the register 240 are the same as the conditions shown in FIG. 3. In this case, the Cv0 bit 241 and the Cd0 bit 242 are used for comparing to the execution control flag F0. The Cv1 bit 243 and the Cd1 bit 244 are used for comparing to the execution control flag F1. The Cv2 bit 245 and the Cd2 bit 246 are used for comparing to the execution control flag F2.

For example, when the value CC that is set for the condition execution field 105 is 001 (CC=001), the register reference section 404 inputs the Cv0 bit 241, the Cd0 bit 242, the Cv1 bit 243, the Cd1 bit 244, the Cv2 bit 245 and the Cd2 bit 246 in the register R1 and then outputs them to the condition execution judgement section 406. The condition execution judgement section 406 compares the values of the Cv0 bit 241 and the Cd0 bit 242, the values of the Cv1 bit 243 and the Cd1 bit 244. and the values of the Cv2 bit and the Cd2 bit with the states of the execution control flags F0, F1 and F3, respectively. When both of them are equal, the condition execution judgement section 406 outputs the indication to execute the instruction to the execution control section 403.

As described above, according to the microprocessor of the second embodiment, because respective target registers are referenced based on values for designating the registers set in the condition execution field 105 and instructions are then executed based on the conditions stored in the those registers, the number of bits to be used for the condition execution field 105 in an instruction can be reduced and the number of bits to be used for the operation field in the instruction can be increased.

Third embodiment.

Figure 17:
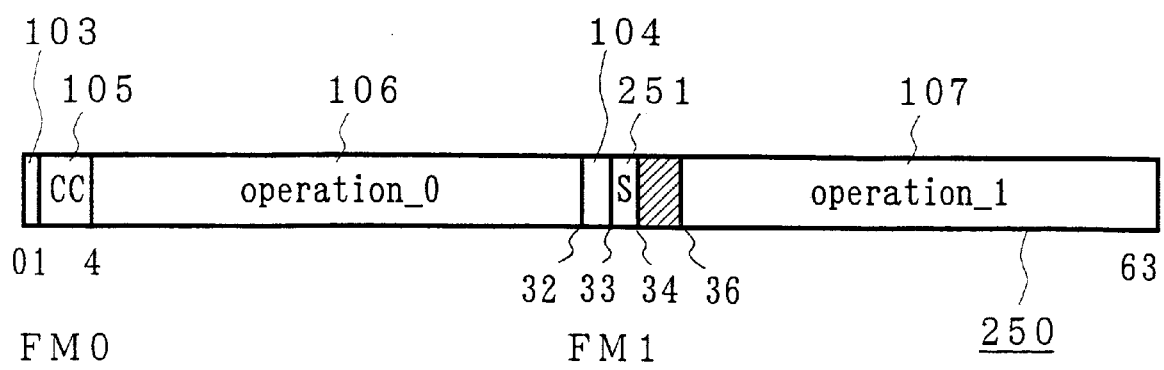
FIG. 17 is an explanation diagram showing a two-operation instruction format used for a microprocessor of the third embodiment according to the present invention.

FIG. 17 is an explanation diagram showing a two-operation instruction format in an instruction used for the microprocessor of the third embodiment according to the present invention. As shown in FIG. 17, the format 250 consists of a format field having a field 103 and a field 104, two operation fields 106 and 107, a condition execution field 105 and an instruction selection condition field 251.

FIG. 18 is a block diagram showing a configuration of the instruction decode unit 2c for performing condition execution operation in the microprocessor of the third embodiment according to the present invention. In FIG. 18, the reference number 405 designates an execution control section for controlling the execution of an instruction based on the content of the instruction selection condition field 251 and the indication from the condition execution judgement section 402. Other components in the instruction decode unit 2c are equal to, in configuration and operation, the components in the instruction decode unit 2a shown in FIG. 12, therefore, the explanation for those is omitted here for brevity.

Next, the operation of the instruction decode unit 2c in the microprocessor of the third embodiment will be explained.

The instruction selection condition field 251 in the format 250 shown in FIG. 17 includes the S-bit of the 1-bit length for selecting one of the execution of the operation__0 in the operation field 106 and the execution operation__1 in the operation field 107. This S-bit will be used as follows:

| | |
| --- | --- |
| CC-condition is not established: | S-bit is neglected (execute no operation__0 and operation__1 |
| CC-condition is established: | Execute both operation__0 and operation__1, and execute operation__0 and not execute operation__o when S-bit = 1. |

Both the condition execution decode section 401 and the condition execution judgement section 402 will operate like the case of the first embodiment. When the condition CC of the condition execution field 105 is established, the condition execution judgement section 402 transfers the indication to execute the instruction to the execution control section 405.

When receiving the indication from the condition execution judgement section 402, the execution control section 405 checks the value of the S-bit. When the S-bit is zero, the execution control section 405 transfers the control signals 11 and 12 to the memory unit 3 and the integer operation unit 4, When the S-bit is 1, the execution control section 405 transfers the control signal 11 to the memory unit 3.

According to the microprocessor of the third embodiment, the executions of the operation_0 and the operation_1 can be controlled by using the instruction selection condition field 251. In other words, two operations designated in a two-operation instruction can be executed based on the conditions. In the configuration of the microprocessor of the third embodiment, although the function to judge the S-bit is added in the configuration of the microprocessor of the first embodiment, the present invention is not limited by this case, for example, it can be acceptable to add the function about the S-bit into the configuration of microprocessor of the second embodiment.

As described above, according to the present invention, the microprocessor having condition execution instructions is formed so that it can be checked whether or not the decoded result of a value in the condition execution field and the condition are equal and the instruction can be executed when both are equal. Thereby, the present invention has the effect that the number of bits to be assigned to the condition execution field in an instruction can be reduced and the number of bits to be assigned to the operation field in the instruction can be increased, so that the number of instructions included in an instruction set of the microprocessor can be increased.

In addition, according to the present invention, the microprocessor having condition execution instructions is formed so that the condition execution field has a bit length which is less than the number of bits that can express all of combinations among general-purpose flags to be used for judgements of condition executions and the condition execution section can decode an encoded value having such bit length. Thereby, the present invention has the effect that the bit length to be assigned to the condition execution field can be further increased.

Furthermore, according to the present invention, the microprocessor having condition execution instructions is formed so that it can be checked whether or not the condition set in the register designated by the condition execution field and the condition in the general-purpose register are equal and the instruction can be executed when both are equal. Thereby, the present invention has the effect that the number of bits to be assigned to the condition execution field in an instruction can be reduced and the number of bits to be assigned to the operation field in the instruction can be increased, so that the number of instructions included in an instruction set of the microprocessor can be increased.

Moreover, according to the present invention, the microprocessor having condition execution instructions is formed so that it can be determined whether or not operations based on a plurality of operation fields in an instruction are executed according to the value set in the instruction selection condition field in the instruction. Thereby, the present invention has the effect that the two-operations in a two-operation instruction can be executed under the conditions.

While the above provides a full and complete disclosure of the preferred embodiments of the present invention, various modifications, alternate constructions and equivalents may be employed without departing from the true spirit and scope of the invention. Therefore the above description and illustration should not be construed as limiting the scope of the invention, which is defined by the appended claims.

What is claimed is:

1. A microprocessor capable of executing condition execution instructions, comprising:
   an instruction decoder for decoding said condition execution instructions, each condition execution instruction having a condition execution field and at least one operation field;
   a control register into which information to control execution of said condition execution instructions is stored, said control register including general purpose flags into which execution conditions for said condition execution instructions are stored;
   general purpose registers for storing data; and
   an instruction execution section for executing said condition execution instructions based on output from said instruction decoder,
   wherein said condition execution field stores a value indicating a register in said general purpose registers in which conditions for said general purpose flags indicating to execute said condition execution instructions are stored, said instruction decoder comprises a register reference section for referencing a value stored in said register designated by using said condition execution field, and a condition execution judgment section for judging whether or not said condition set in said register referenced by said register reference section is equal to the execution condition indicated by said general purpose flags, and executing said condition execution instruction when said condition set in said register is equal to said execution condition indicated by said general purpose flags.

2. A microprocessor as claimed in claim 1, wherein said condition execution field consists of a 3-bit length field.

3. A microprocessor as claimed in claim 1, wherein said condition execution field consists of a 5-bit length field.

4. A microprocessor as claimed in claim 1, wherein said instruction decoder decodes said condition execution instructions, each instruction having a condition execution field, an instruction selection condition field and a plurality of operation fields, said instruction execution section comprises a plurality of operation circuits, and said instruction decoder further comprises an execution control section for determining whether or not operations based on contents stored in said plurality of operation fields are performed according to a set value stored in said instruction selection condition field.

5. A microprocessor as claimed in claim 4, wherein said instruction selection condition field consists of a one-bit length field.

6. A microprocessor capable of executing condition execution instructions, comprising:
   an instruction decoder for decoding said condition execution instructions, each of said condition execution instructions having at least one condition execution field and at least one operation field;
   a control register into which information to control execution of said condition execution instructions is stored, said control register including general purpose flags into which execution conditions for said condition execution instructions are stored; and
   an instruction execution section for executing said condition execution instructions based on output from said instruction decoder,
   wherein said condition execution field in each condition execution instruction stores an encoded value obtained by encoding said execution conditions stored in said general purpose flags for indicating execution of said condition execution instructions, and said instruction decoder comprises a condition execution decode section for decoding values set in said condition execution fields, judging whether or not said decoded result obtained by said condition execution decode section is equal to said execution conditions stored in said general purpose flags, and determining to execute said condition execution instruction when said decoded result is equal to said execution conditions, and wherein said instruction decoder decodes said condition execution instructions, each instruction having a condition execution field, an instruction selection condition field and a plurality of operation fields, said instruction execution section comprises a plurality of operation circuits, and said instruction decoder further comprises an execution control section for determining whether or not operations based on contents stored in said plurality of operation fields are performed according to a set value stored in said instruction selection condition field.

7. A microprocessor as claimed in claim 6, wherein said instruction selection condition field consists of a one-bit length field.

8. A microprocessor as claimed in claim 6, wherein said instruction decoder decodes said condition execution instructions, each instruction having a condition execution field, an instruction selection condition field and a plurality of operation fields, said instruction execution section comprises a plurality of operation circuits, and said instruction decoder further comprises an execution control section for determining whether or not operations based on contents stored in said plurality of operation fields are performed according to a set value stored in said instruction selection condition field.

9. A microprocessor as claimed in claim 8, wherein said instruction selection condition field consists of a one-bit length field.

10. A microprocessor, comprising:

a control register including m flags, each flag indicating one of a first value and a second value;

an instruction decoder for decoding a condition execution instruction including an operation field and a condition execution field, said condition execution field being capable of specifying $3^m$ execution conditions, each execution condition being expressed by that each of said m flags has one of values, don't care, said first value, and said second value; and an instruction execution section for performing an operation specified by said operation field based on a decoded result of said instruction decoder, wherein said instruction decoder comprises:
　a condition execution decode section for decoding said condition execution field; and
　a judgement section for judging whether said execution condition is satisfied in accordance with a decoded result of said condition execution decode section and said m flags, said instruction execution section performing the operation when said execution condition is satisfied, wherein said condition execution field consists of a minimum bit number that can express a binary number of $3^m$.

11. A microprocessor as claimed in claim 10, wherein m=3 and a length of said condition execution field is a 5-bit length.

* * * * *